US012222738B2

(12) United States Patent
Anderson et al.

(10) Patent No.: US 12,222,738 B2
(45) Date of Patent: Feb. 11, 2025

(54) METHOD AND SYSTEM FOR CONTROLLING ELECTRIC DRIVE SYSTEM ACCORDING TO PREDICTED TEMPERATURE OF DC-LINK CAPACITOR TO PREVENT OVERHEATING

(71) Applicant: Ford Global Technologies, LLC, Dearborn, MI (US)

(72) Inventors: Monty J. Anderson, Boise, ID (US); William Robert Brown, Huntington Woods, MI (US); Jogendra Singh Thongam, Windsor (CA); Joseph Sherman Kimmel, Carleton, MI (US); Papiya Bagchi, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 547 days.

(21) Appl. No.: 17/590,237

(22) Filed: Feb. 1, 2022

(65) Prior Publication Data

US 2023/0244257 A1   Aug. 3, 2023

(51) Int. Cl.
   *G05D 23/20*   (2006.01)
   *B60L 15/00*   (2006.01)

(52) U.S. Cl.
   CPC ........ *G05D 23/2033* (2013.01); *B60L 15/007* (2013.01); *B60L 2210/40* (2013.01)

(58) Field of Classification Search
   CPC ............... G05D 23/2033; B60L 15/007; B60L 2210/40; B60L 2240/525; B60L 3/12; B60L 3/003; Y02T 10/70; H02P 29/60
   See application file for complete search history.

(56) References Cited

U.S. PATENT DOCUMENTS

| 7,215,023 | B2 * | 5/2007 | Baeumel | H01L 25/16 |
| | | | | 257/E23.098 |
| 11,368,083 | B2 * | 6/2022 | Appel | H02M 1/32 |

(Continued)

FOREIGN PATENT DOCUMENTS

| EP | 2453571 A1 | 5/2012 |
| EP | 3859357 A1 | 8/2021 |

(Continued)

OTHER PUBLICATIONS

Non Final Office Action for U.S. Appl. No. 17/668,494, dated Oct. 23, 2024, 23 Pages.

*Primary Examiner* — Stacy Whitmore
(74) *Attorney, Agent, or Firm* — David B. Kelley; Brooks Kushman P.C

(57) ABSTRACT

An electric drive system includes a power electronics module (PEM) having a DC-link capacitor and an inverter. A controller reduces power output of the inverter while a sensed temperature of an inverter power switch, a sensed current of the PEM, such as a sensed ripple current of the DC-link capacitor, and parameter values of the DC-link capacitor are indicative of a predicted temperature of the capacitor being greater than a threshold to maintain capacitor temperature lower than the threshold. The parameter values are obtainable from a thermal model of the DC-link capacitor. The thermal model may be derived from testing a test version of the PEM under different drive cycles in which for each drive cycle a set of information is recorded including a sensed temperature of the inverter power switch test version, a current of the PEM test version, and a sensed temperature of the DC-link capacitor test version.

16 Claims, 5 Drawing Sheets

(56) References Cited

U.S. PATENT DOCUMENTS

| | | | |
|---|---|---|---|
| 11,811,349 B2* | 11/2023 | Anderson | B60L 50/51 |
| 2002/0175653 A1* | 11/2002 | Elliot | H02P 25/098 |
| | | | 318/701 |
| 2004/0027076 A1* | 2/2004 | Shimizu | B60L 50/61 |
| | | | 318/55 |
| 2006/0178852 A1 | 8/2006 | Johns et al. | |
| 2009/0052210 A1 | 2/2009 | Ward et al. | |
| 2009/0063070 A1 | 3/2009 | Renneberg | |
| 2012/0016547 A1* | 1/2012 | Aridome | B60L 58/14 |
| | | | 180/65.265 |
| 2012/0021263 A1* | 1/2012 | Nishi | H01M 10/657 |
| | | | 429/62 |
| 2015/0236616 A1* | 8/2015 | Aldinger | H02M 7/537 |
| | | | 363/97 |
| 2015/0256105 A1* | 9/2015 | Kano | B60L 15/2009 |
| | | | 363/131 |
| 2016/0266189 A1* | 9/2016 | Yoshida | G01R 31/64 |
| 2017/0125998 A1* | 5/2017 | Tiziani | H01L 23/34 |
| 2017/0217313 A1 | 8/2017 | Hashimoto | |
| 2019/0244445 A1* | 8/2019 | Kyes | B60W 50/0205 |
| 2019/0319571 A1 | 10/2019 | Kim et al. | |
| 2020/0007066 A1* | 1/2020 | Gondo | H02P 21/16 |
| 2020/0100400 A1 | 3/2020 | He et al. | |
| 2020/0111610 A1* | 4/2020 | Haas Rugel | H01G 4/32 |
| 2020/0204061 A1* | 6/2020 | Minesawa | G01K 7/01 |
| 2020/0379057 A1 | 12/2020 | El Hayek et al. | |
| 2021/0018016 A1 | 1/2021 | Kim et al. | |
| 2021/0178908 A1* | 6/2021 | Kim | B60L 15/32 |
| 2022/0200512 A1* | 6/2022 | Anderson | B60L 50/51 |
| 2022/0365143 A1* | 11/2022 | Schroth | G01R 27/2605 |
| 2023/0255006 A1* | 8/2023 | Anderson | H02P 21/22 |
| | | | 165/287 |

FOREIGN PATENT DOCUMENTS

| | | |
|---|---|---|
| JP | H06296399 A | 10/1994 |
| WO | 2022109699 A1 | 6/2022 |

* cited by examiner

Thermal Block Diagram

METHOD AND SYSTEM FOR CONTROLLING ELECTRIC DRIVE SYSTEM ACCORDING TO PREDICTED TEMPERATURE OF DC-LINK CAPACITOR TO PREVENT OVERHEATING

TECHNICAL FIELD

The present invention relates to controlling an inverter of a power electronics module of an electric drive system according to a predicted temperature of a DC-link capacitor of the power electronics module to thereby prevent overheating of the power electronics module.

BACKGROUND

An electric drive system includes a battery, a power electronics module, and a motor. The power electronics module includes a DC-link capacitor and an inverter. The inverter converts electrical power input from the battery via the DC-link capacitor into a desired electrical power to output to the motor.

SUMMARY

An electric drive system includes a power electronics module and a controller. The power electronics module includes a DC-link capacitor and an inverter. The controller is configured to reduce power output of the inverter while a sensed temperature of a power switch of the inverter, a sensed current of the power electronics module, and parameter values of the DC-link capacitor are indicative of a predicted temperature of the DC-link capacitor being greater than a threshold to maintain DC-link capacitor temperature lower than the threshold.

The parameter values of the DC-link capacitor are obtainable from a thermal model of the DC-link capacitor.

In an embodiment, the thermal model of the DC-link capacitor is derived from testing a test version of the power electronics module under different drive cycles in which for each drive cycle a set of information is recorded including a sensed temperature of the power switch of the inverter of the test version of the power electronics module, a sensed current of the test version of the power electronics module, and a sensed temperature of the DC-link capacitor of the test version of the power electronics module.

In this embodiment, the sensed current of the test version of the power electronics module may be a sensed (i.e., measured and/or calculated) ripple current of the DC-link capacitor of the test version of the power electronics module. In which case the parameter values of the DC-link capacitor are obtained from the thermal model of the DC-link capacitor by finding which values of a DC-link capacitor temperature thermal equation having variables of power switch temperature, DC-link capacitor ripple current, and the parameters fit the set of information recorded for at least one of the drive cycles.

In an embodiment, the sensed current of the power electronics module is a sensed ripple current of the DC-link capacitor. The sensed ripple current of the DC-link capacitor may be measured using a current sensor, wherein the controller is in communication with the current sensor. Alternatively, the sensed ripple current of the DC-link capacitor may be calculated based on various operating parameters.

In an embodiment, the sensed current of the power electronics module includes either a sensed DC current drawn by the inverter, the sensed DC current drawn by the inverter and a sensed ripple current of the DC-link capacitor, or the sensed DC current drawn by the inverter and a sensed AC current outputted by the inverter. Any of the DC current drawn by the inverter, the ripple current of the DC-link capacitor, and the AC current outputted by the inverter may be sensed using current sensors, wherein the controller is in communication with the current sensors.

The controller may be configured to reduce power output of the inverter by de-rating operation of the DC-link capacitor.

The electric drive system may be of an electric vehicle and further include a traction battery and a motor with the DC-link capacitor disposed between the battery and the inverter. In this case, the inverter may be further configured to convert an input electrical power from the traction battery via the DC-link capacitor into an output electrical power and provide the output electrical power to the motor for propelling the electric vehicle.

The temperature of the power switch, such as an insulated gate bipolar transistor (IGBT), of the inverter may be sensed by a temperature sensor incorporated with the power switch. The controller is in communication with the temperature sensor.

An electric vehicle includes an electric drive system and a controller. The electric drive system includes a traction battery, a power electronics module, and a motor. The power electronics module includes a DC-link capacitor and an inverter. The inverter is configured to convert an input electrical power from the traction battery via the DC-link capacitor into an output electrical power and provide the output electrical power to the motor for propelling the electric vehicle. The controller is configured to predict a temperature of the DC-link capacitor using a sensed temperature of a power switch of the inverter, a sensed current of the power electronics module, and parameter values obtained from a thermal model of the DC-link capacitor. The controller is further configured to de-rate the electric drive system while the predicted temperature of the DC-link capacitor is greater than a temperature threshold to prevent overheating.

A method for an electric drive system including a power electronics module having a DC-link capacitor and an inverter includes sensing a temperature of a power switch of the inverter and sensing a current of the power electronics module. The method further includes reducing power output of the inverter while the sensed temperature of the power switch, the sensed current of the power electronics module, and parameter values of the DC-link capacitor are indicative of a predicted temperature of the DC-link capacitor being greater than a threshold to maintain DC-link capacitor temperature lower than the threshold. The parameter values of the DC-link capacitor are obtainable from a thermal model of the DC-link capacitor.

As described herein, the temperature of a DC-link capacitor in a power electronics module of a production electric drive system should not exceed a critical temperature threshold. Furthermore, it is often economically desirable to not have hardware dedicated to measuring the temperature of the DC-link capacitor.

In accordance with embodiments of the present invention, the temperature of a DC-link capacitor in a power electronics module of a production electric drive system can be well estimated using: (i) a thermal model of the DC link capacitor ("DC-link capacitor thermal model") containing relatively few constant parameters; (ii) the temperature of a power switch of the inverter (in embodiments, the power switches are insulated gate bipolar transistors (IGBTs) and have at least one temperature sensor embedded into the power switch hardware); and (iii) a current of the power electronics module.

In exemplary embodiments described and illustrated herein, the current of the power electronics module is the ripple current of the DC-link capacitor, which is sensed by a current sensor.

The parameters of the DC-link capacitor thermal model are determined by using one or more "test" power electronics modules having a DC-link capacitor and an inverter. The test power electronics module has been instrumented with additional thermal sensors (e.g., thermocouples), including direct measurement of the DC-link capacitor temperature, for the purpose of calibration work. The instrumented power electronics module is driven through a plurality of cycles that cause the DC-link capacitor and the inverter to operate near their capability limits (typically high current cycles (e.g., repeated hard accelerations, trailer tow, steep climbs, etc.)). The parameters of the DC-link capacitor thermal model are then found via a best fit relationship between DC-link capacitor temperature, power switch temperature, and DC-link capacitor ripple current. The parameters of the DC-link capacitor thermal model could also be estimated from complex CAE thermal models of the DC-link capacitor.

In a production power electronics module, the DC-link capacitor temperature is estimated (i.e., predicted) and repeatedly updated by the controller of the inverter system. This estimate is provided to other control software responsible for DC-link capacitor and inverter hardware protection and compared against a DC-link capacitor temperature limit threshold. When necessary, action can then be taken to prevent the DC-link capacitor and components of the inverter from overheating (e.g., temporarily de-rating the electric current capability of the inverter).

The DC-link capacitor thermal model is superior to alternative strategies for DC-link capacitor and inverter hardware protection including: (a) directly measuring the temperature of the DC-link capacitor in a production power electronics module—this would increase hardware complexity and expense; and (b) protecting the DC-link capacitor and components of the inverter from excess temperature by preventing the inverter from exceeding average current vs. time thresholds—this approach is based on worst case thermal conditions and can be overly conservative, causing the inverter to de-rate even when the DC-link capacitor is well below its temperature threshold (e.g., unnecessary reduction in vehicle performance).

In the exemplary embodiments described and illustrated herein, the DC-link capacitor and the inverter are part of a power electronics module of an electric vehicle. However, in accordance with embodiments of the present invention, the DC-link capacitor and inverter are applicable more broadly to any power electronics module (including applications other than vehicle applications) where a DC-link capacitor of the power electronics module requires thermal protection, but dedicated hardware is undesirable and time-based current limits are too conservative.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The DC-link capacitor and the inverter are to be protected from excessive temperature caused by operation of the electric drive system. The DC-link capacitor and the inverter may be protected from excessive temperature by limiting the time during which the power electronics module operates at relatively high output power levels. This protection strategy can sometimes de-rate the electric drive system.

Figure 1:
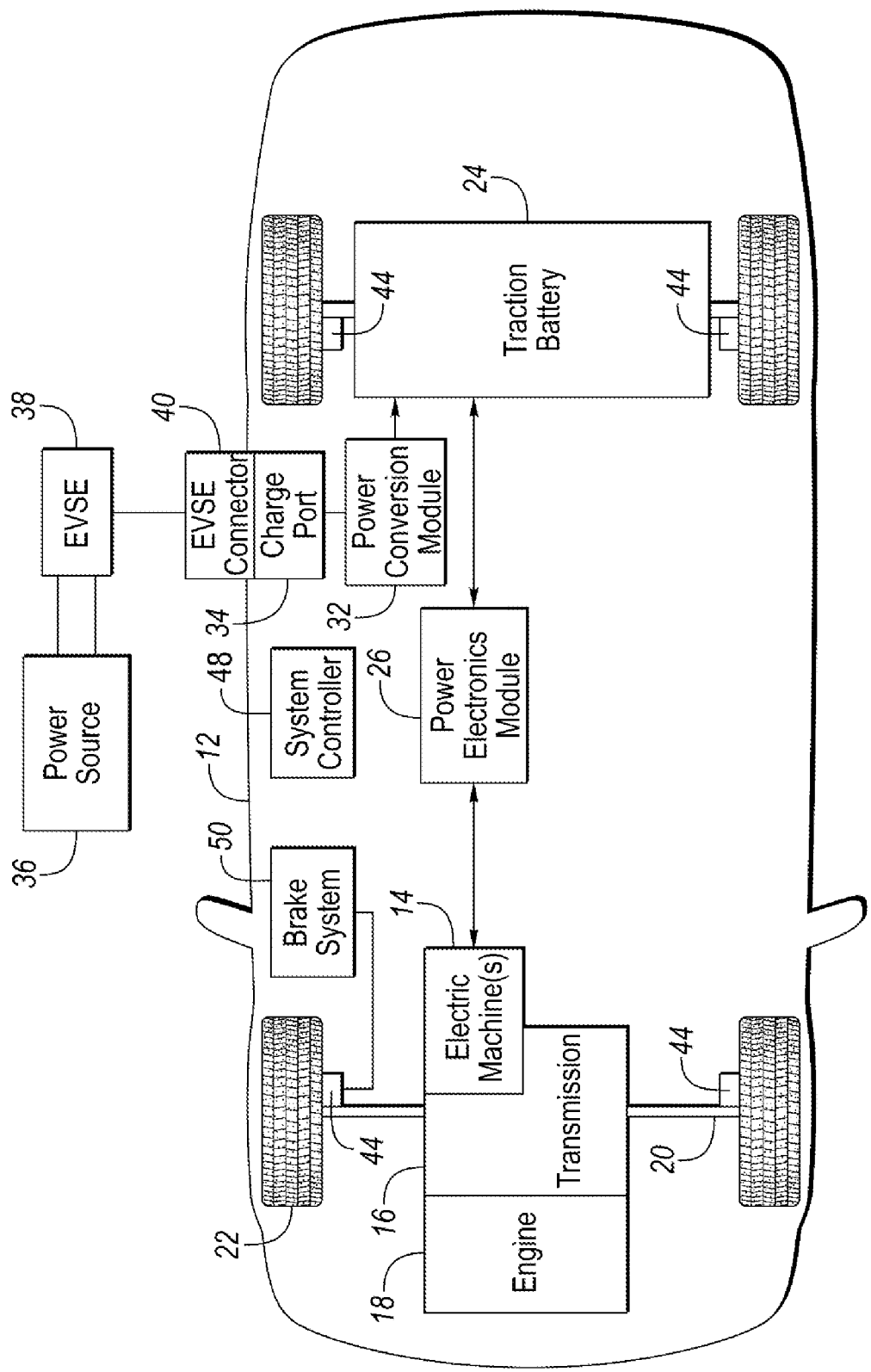
FIG. 1 illustrates a block diagram of an electric vehicle.

Referring now to FIG. 1, a block diagram of an exemplary electric vehicle ("EV") 12 is shown. In this example, EV 12 is a plug-in hybrid electric vehicle (PHEV). EV 12 includes one or more electric machines 14 ("e-machines") mechanically connected to a transmission 16. Electric machine 14 is capable of operating as a motor and as a generator. Transmission 16 is mechanically connected to an engine 18 and to a drive shaft 20 mechanically connected to wheels 22. Electric machine 14 can provide propulsion and slowing capability while engine 18 is turned on or off. Electric machine 14 acting as a generator can recover energy that may normally be lost as heat in a friction braking system. Electric machine 14 may reduce vehicle emissions by allowing engine 18 to operate at more efficient speeds and allowing EV 12 to be operated in electric mode with engine 18 off under certain conditions.

A traction battery 24 ("battery) stores energy that can be used by electric machine 14 for propelling EV 12. Battery 24 typically provides a high-voltage (HV) direct current (DC) output. Battery 24 is electrically connected to a power electronics module 26. Power electronics module 26 is electrically connected to electric machine 14 and provides the ability to bi-directionally transfer energy between battery 24 and the electric machine. For example, battery 24 may provide a DC voltage while electric machine 14 may require a three-phase alternating current (AC) current to function.

Power electronics module 26 may convert the DC voltage to a three-phase AC current to operate electric machine 14. In a regenerative mode, power electronics module 26 may convert three-phase AC current from electric machine 14 acting as a generator to DC voltage compatible with battery 24.

Battery 24 is rechargeable by an external power source 36 (e.g., the grid). Electric vehicle supply equipment (EVSE) 38 is connected to external power source 36. EVSE 38 provides circuitry and controls to control and manage the transfer of energy between external power source 36 and EV 12. External power source 36 may provide DC or AC electric power to EVSE 38. EVSE 38 may have a charge connector 40 for plugging into a charge port 34 of EV 12. Charge port 34 may be any type of port configured to transfer power from EVSE 38 to EV 12. A power conversion module 32 of EV 12 may condition power supplied from EVSE 38 to provide the proper voltage and current levels to battery 24. Power conversion module 32 may interface with EVSE 38 to coordinate the delivery of power to battery 24. Alternatively, various components described as being electrically connected may transfer power using a wireless inductive coupling.

Wheel brakes 44 are provided for slowing and preventing motion of EV 12. Wheel brakes 44 are part of a brake system 50. Brake system 50 may include a controller to monitor and control wheel brakes 44 to achieve desired operation.

The various components discussed may have one or more associated controllers to control and monitor the operation of the components. The controllers can be microprocessor-based devices. The controllers may communicate via a serial bus (e.g., Controller Area Network (CAN)) or via discrete conductors. For example, a system controller 48 (i.e., a vehicle controller) is present to coordinate the operation of the various components.

As described, EV 12 is in this example is a PHEV having engine 18 and battery 24. In other embodiments, EV 12 is a battery electric vehicle (BEV). In a BEV configuration, EV 12 does not include an engine.

Figure 2:
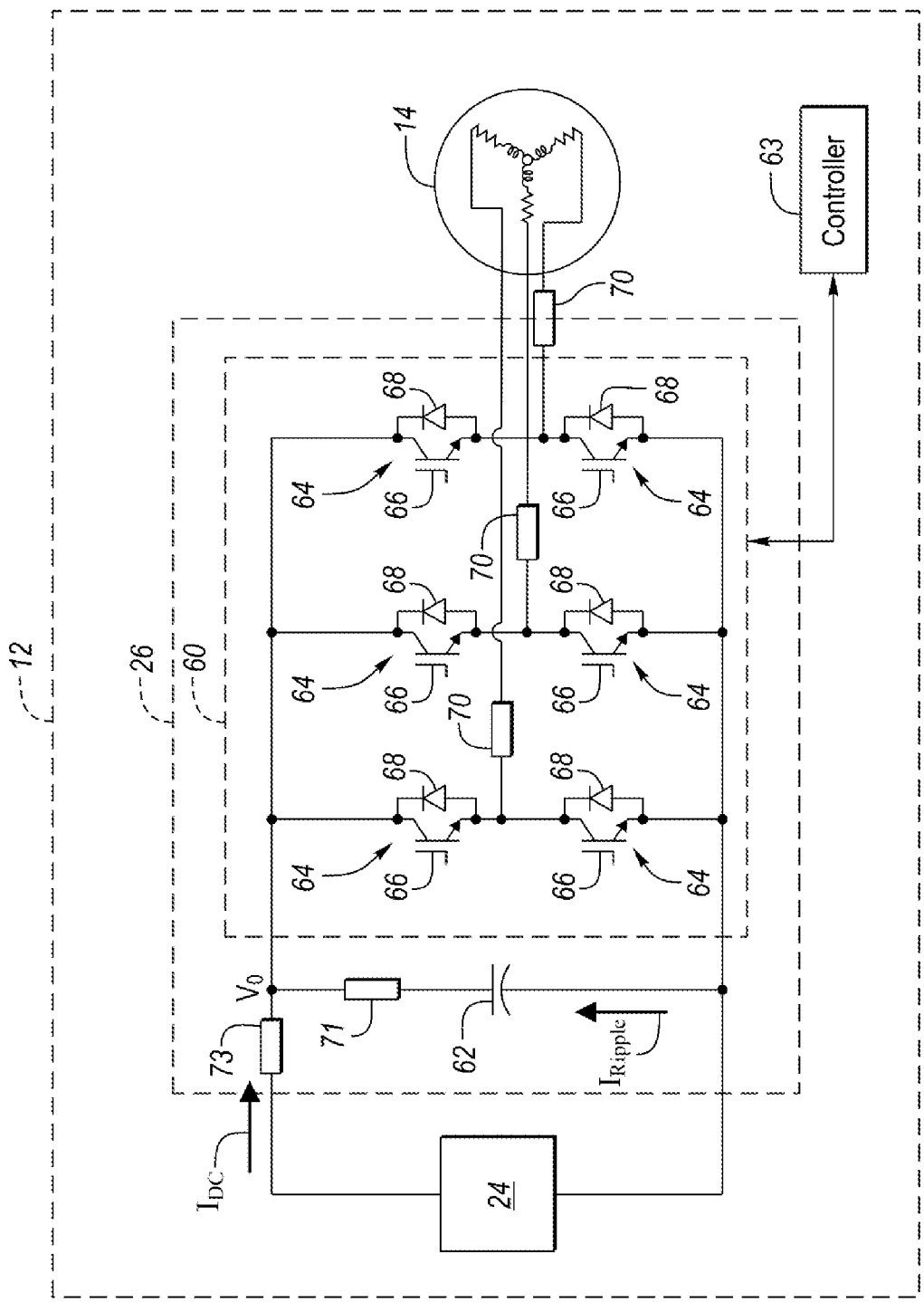
FIG. 2 illustrates a schematic diagram of components of an electric drive system of the electric vehicle, the components of the electric drive system including a traction battery, a power electronics module having a DC-link capacitor and an inverter, and a motor.
Figure 3:
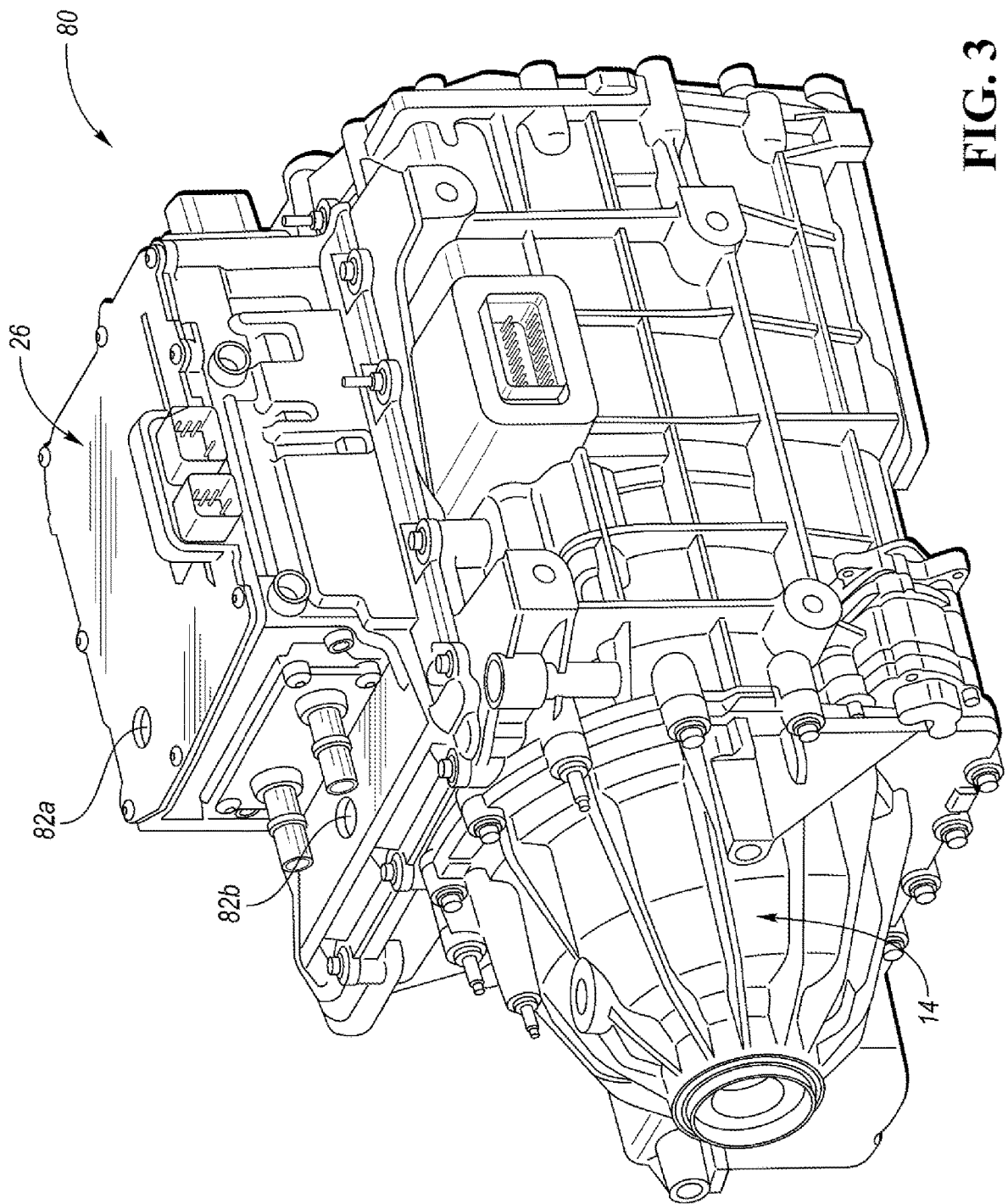
FIG. 3 illustrates a perspective view of a test version of an eDrive unit of the electric drive system, the eDrive unit including the power electronics module and the motor of the electric drive system.

Referring now to FIG. 2, with continual reference to FIG. 1, a schematic diagram of components of an electric drive system of EV 12 is shown. As shown in FIG. 2, the electric drive system of EV 12 includes traction battery 24, power electronics module 26, and electric machine (i.e., "motor") 14. Power electronics module 26 and motor 14 may be assembled together and thereby form an "eDrive" unit of the electric drive system, such as shown in FIG. 3.

As described above, power electronics module 26 is coupled between battery 24 and motor 14. Power electronics module 26 converts DC electrical power provided from battery 24 into AC electrical power for providing to motor 14. In this way, power electronics module 26 drives motor 14 with power from battery 24 for the motor to propel EV 12.

Power electronics module 26 includes a DC-link capacitor 62 and an inverter 60 (or "inverter control system" ("ICS")). Inverter 60 shown in FIG. 2 is an exemplary inverter. DC-link capacitor 62 is disposed between battery 24 and inverter 60 and is connected in parallel with battery 24. DC-link capacitor 62 is operable to absorb ripple currents generated by operation of power switches of inverter 60 and stabilize a DC-link voltage Vo for inverter 60 control.

As known to those of ordinary skill, inverters convert DC power to multi-phase AC power (three-phase being most common). Inverters can move electrical power in either direction (bi-directional) either driving an electric machine (i.e., motoring) or to electrically braking the electric machine (i.e., generating). An inverter system is made up of a combination of power electronic hardware (switches) and control software (FIG. 2 is a representative drawing). Electrical current can be quickly adjusted by opening and closing the power switches in the inverter.

Many inverter systems, including inverters relevant to embodiments of the present invention such as inverter 60, perform closed loop current control to precisely control the e-machine. To achieve this, the electric current in each phase of the inverter is sensed with a current sensor and a corresponding signal is provided to the controller of the inverter system. The most common approach is to sense all of the phases, but any one phase current can be inferred from knowledge of the other phase currents. The current sensor can use and/or be implemented in different technologies and current sensors 70 shown in FIG. 2, discussed below, are but one example. Such current sensors are typically integrated into the inverter.

Inverter 60 includes inverting circuitry and heat generating components such as a plurality of power switching units 64. As known to those of ordinary skill, in the exemplary example, inverter 60 includes three sets of pairs of power switching units 64 (i.e., three×two=a total of six power switching units 64 as shown in FIG. 2). Each set pair of power switching units 64 includes two power switching units 64 connected in series. Each power switching unit 64 includes a power switch 66, in the form a transistor, arranged anti-parallel with a diode 68. In this example, the transistor is an insulated gate bipolar transistor (IGBT). Each set pair of power switching units 64 is connected in parallel with battery 24 and DC-link capacitor 62 and thereby each set pair of power switching units forms a "phase" of inverter 60. In this way, inverter 60, having three set pairs of power switching units 64, is a three-phase inverter operable for converting DC electrical power from battery 24 into three-phase AC electrical power for providing to motor 14.

Further, each phase of inverter 60 includes a current sensor 70. For instance, each current sensor 70 is a resistive shunt connected in series with the output of the corresponding phase. Current sensors 70 are operable for sensing the electrical current ($I_{AC}$) outputted from the corresponding phases of inverter 60 to motor 14.

Further, a current sensor 71 is associated with DC-link capacitor 62. For instance, current sensor 71 is a resistive shunt connected in series with DC-link capacitor 62. Current sensor 71 is operable for sensing an electrical ripple current ($I_{Ripple}$) of DC-link capacitor 62. Alternatively, the electrical ripple current ($I_{Ripple}$) of DC-link capacitor 62 is calculated based on various operating parameters.

Further, a current sensor 73 is associated with the input of inverter 60. For instance, current sensor 73 is a resistive shunt connected in series with the input of inverter 60 (i.e., extending towards inverter 60 from the node at which traction battery 24, DC-link capacitor 62, and inverter 60 are connected). Current sensor 73 is operable for sensing an electrical input DC current ($I_{DC}$) drawn by inverter 60.

Power electronics module 26 has an associated controller 63. Controller 63 can be a microprocessor-based device. Controller 63 is configured to monitor operation of DC-link capacitor 62 and to monitor and control operation of inverter 60. Particularly, controller 63 is operable to control the operation of power switches 66 to cause inverter 60 to convert a given DC electrical power provided from battery 24 via DC-link capacitor 62 into a desired AC electrical power for providing to motor 14. Controller 63 is in communication with current sensors 70 to monitor the AC electrical power provided from inverter 60 to motor 14.

Controller 63 uses information of current sensors 70 as feedback in controlling inverter 60 to output the desired AC electrical power to motor 14.

Power switches 66 are associated with temperature sensors (e.g., thermistors) (not shown) which directly measure the temperature of the power switches. For instance, each power switch 66 has embedded diodes therein which are configured to function as a temperature sensor operable for providing the temperature of the power switch. Controller 63 is in communication with these temperature sensors to monitor the temperatures of power switches 66. Controller 63 may control the operation of inverter 60 according to the monitored temperatures of power switches 66 to prevent overheating.

Notably, the temperature of DC link capacitor 62 is not directly measurable. DC-link capacitor 62 and components of inverter 60 are to be protected from excessive temperature caused by the operation of the inverter in converting the input power to the output power. In accordance with embodiments, a DC-link capacitor thermal model (i.e., a temperature schedule) is generated for use in a protection strategy such that the capability of the electric drive system is not unnecessarily limited as the case may be with the protection strategy of limiting the time during which the inverter operates at relatively high power (e.g., AC $I_{RMS}$) output levels. Accordingly, use of the DC-link capacitor thermal model is intended to enable the electric drive system to be de-rated only when DC-link capacitor 62 and components of inverter 60 may overheat.

Referring now to FIG. 3, with continual reference to FIGS. 1 and 2, a perspective view of a test version 80 of the eDrive unit of the electric drive system of EV 12 is shown. eDrive unit test version 80 includes power electronics module 26 and motor 14 assembled together. As described, power electronics module 26 includes DC-link capacitor 62 and inverter 60. For testing eDrive unit test version 80, pass-through holes 82a, 82b are provided for receiving thermocouples. A thermocouple is placed on DC-link capacitor 62 of power electronics module 26. Thermocouples may be placed on current sensors 70 and/or other components of inverter 60 of power electronics module 26. Thermocouples may be placed on the coolant (e.g., glycol) inlet and outlet associated with power electronics module 26. The thermocouples are operable for directly measuring the temperature of the components on which the thermocouples are placed. With the various thermocouples in place, eDrive unit test version 80 is run under a number of different high-current drive cycles with the temperature of DC-link capacitor 62 and the temperature of any monitored component of inverter 60 being recorded.

Figure 4:
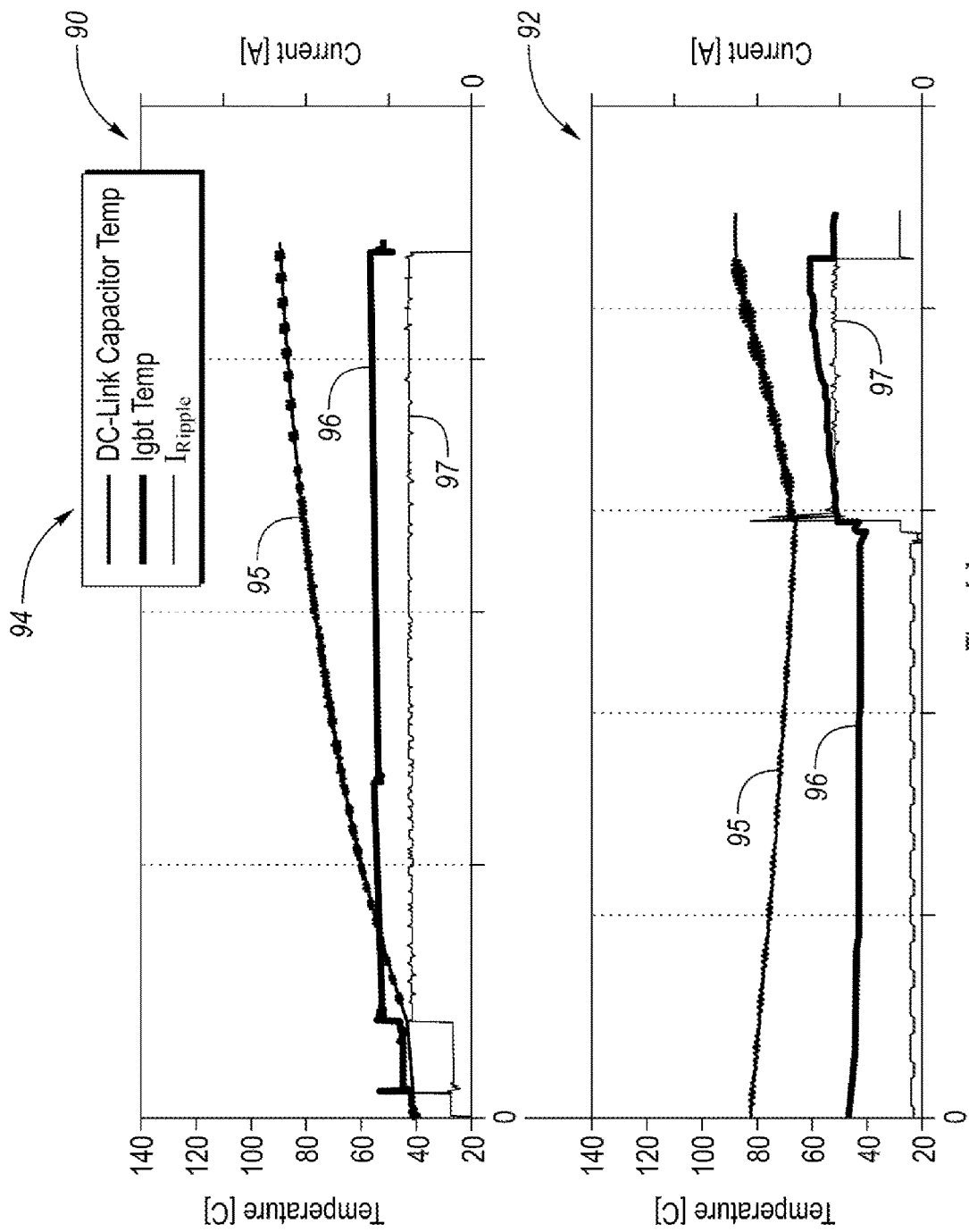
FIG. 4 illustrates a first exemplary graph of plotted information generated from testing the eDrive unit test version with a first high-current drive cycle, a second exemplary graph of plotted information generated from testing the eDrive unit test version with a different second high-current drive cycle, and a legend providing labeling for the plotted information.

FIG. 4 illustrates a first exemplary graph 90 of plotted information generated from testing eDrive unit test version 80 with a first one of the high-current drive cycles, a second exemplary graph 92 of plotted information generated from testing the eDrive unit test version with a different second one of the high-current drive cycles, and a legend 94 providing labeling for the plotted information. Of course, eDrive unit test version 80 may be tested with many other high-current drive cycles and/or may be retested with any of the high-current drive cycles. As such, any number of graphs could be generated from testing eDrive test unit version 80. First and second exemplary graphs 90 and 92, which pertain to the test results from testing eDrive unit test version 80 with respective first and second different high-current drive cycles, are simply provided in FIG. 4 as being representative of the testing of eDrive unit test version 80 with high-current drive cycles for an example for understanding the process for generating the DC-link capacitor thermal model.

The plotted information of graphs 90 and 92, and as labeled in legend 94, includes: a plot 95 of the temperature of DC-link capacitor 62 of inverter 60 as recorded while eDrive unit test version 80 is being run; and a plot 96 of the temperature of one of the switches 66 (i.e., IGBT temperature) of one of the switching units 64 of inverter 60 as recorded while eDrive unit test version 80 is being run, wherein the one of the power switches 66 is preferably the switch of the six power switches having the highest temperature. The plotted information further includes a plot 97 of an electrical ripple current ("$I_{Ripple}$") of DC-link capacitor 62 as recorded while eDrive unit test version 80 is being run.

Other information recorded while eDrive unit test version 80 is being run, and which may also be part of the plotted information of graphs 90 and 92, includes the temperature(s) of component(s) of inverter 60, the ambient temperature of the environment of the eDrive unit test version, the temperature of the stator coil of motor 14, the temperature of the coolant inlet and/or coolant outlets associated with power electronics module 26, and the like.

The plotted information of graphs 90 and/or 92 represents a thermal model of DC-link capacitor 62 of power electronics module 26 of eDrive unit test version 80. As eDrive unit test version 80 is the same type of eDrive unit as the eDrive unit of the electric drive system of EV 12, the DC-link capacitor thermal model is representative of DC-link capacitor 62 of power electronics module 26 of the EV.

Accordingly, controller 63 predicts the temperature of DC-link capacitor 62 of power electronics module 26 of EV 12 by using (i) the measured temperature of a power switch 66 (i.e., IGBT temperature) of inverter 60 of power electronics module 26 of EV 12, (ii) the ripple current of DC-link capacitor 62 of power electronics module 26 of EV 12 (i.e., $I^2_{Ripple}$), and (iii) the values of the unknown parameters determined from the DC-link capacitor thermal model. In this way, controller 63 uses the DC-link capacitor thermal model and the known sensed (i.e., measured and/or calculated) quantities, IGBT temperature ($T_{IGBT}$) and DC-link capacitor ripple current ($I^2_{Ripple}$), to predict the temperature of DC-link capacitor 62 of power electronics module 26 of EV 12. (As noted herein, the temperature of DC-link capacitor 62 of power electronics module 26 of EV 12 is not directly measurable and thereby the temperature of DC-link capacitor 62 is "predicted".)

Figure 5:
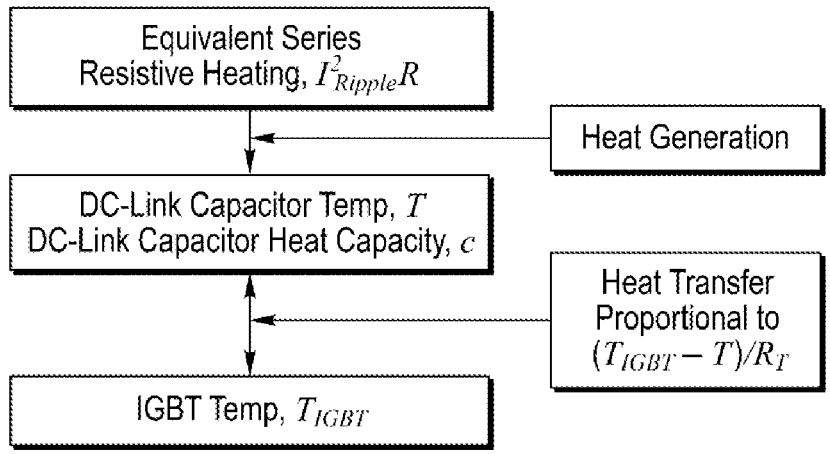
FIG. 5 illustrates a block diagram indicative of thermodynamics involving the DC-link capacitor of the power electronics module of the electric drive system during operation of the electric drive system.

The procedure for obtaining the parameter information based on the DC-link capacitor thermal model will now be described. For reference, FIG. 5 illustrates a block diagram indicative of thermodynamics involving DC-link capacitor 62 and a power switch 66 of inverter 60 of power electronics module 26 of EV 12 during operation of the electric drive system of the EV.

The governing thermal equation for predicting the temperature of DC-link capacitor 62 from the IGBT temperature ($T_{IGBT}$) and the DC-link capacitor ripple current ($I^2_{Ripple}$) is:

$$\dot{T}_C = (T_{IGBT} - T)/R_T + I_{Ripple}^2 R$$

$$I_{Ripple}^2 = I_{RMS}^2 [2\sqrt{3}M + (8\sqrt{3} + 18M)M(PF^2)]/\pi^2 \quad (1)$$

$I_{RMS}$ is the RMS value of the current outputted from inverter 60 to motor 14 (or received by the inverter from generator 14); M is the modulation index; and PF is the power factor.

Rearranging and grouping the variables provides the following thermal equation:

$$\dot{T} + \alpha T = \alpha(T_{IGBT} + I_{Ripple}^2 RR_T) \quad (2)$$

The solution to the differential equation:

$$T(t) = T(0)e^{-\alpha t} + \alpha e^{-\alpha t}\int e^{\alpha t}(T_{IGBT}(t) + I_{Ripple}^2(t)RR_T)dt \quad (3)$$

$R_T$ is thermal resistances with units [K/W], R is electrical resistance with units [V/A], c is thermal heat capacitance with units [W−s/K], and α is a thermal time constant with units [1/s]. The constant α and the constant $RR_T$ are unknown. (The constant $RR_T$ is the bulk constant.) The temperature T(0) is the temperature of DC-link capacitor 62 at key-on.

The individual parameters used in the derivation cannot be solved for independently in this context (and it is unnecessary to do so) but they can be lumped into two parameters (α and $RR_T$) that can be fit to the recorded data obtained from testing eDrive unit test version 80 (e.g., recorded data such as recorded data plotted in exemplary graphs 90 and 92). In this regard, the unknown constants α and $RR_T$ are fitted to the recorded data obtained from testing eDrive unit test version 80. The unknown constants are fitted to the experimental data such as by use of a least square algorithm. For the particular hardware used to illustrate this example of the present invention the unknown constants were determined to be:

$$\alpha = 0.0014 [s^{-1}]$$

$$RR_T = 0.00080 [KA^{-2}] \quad (4)$$

The DC-link capacitor thermal model with fitted parameters $\alpha = 0.0014[s^{-1}]$ and $RR_T = 0.00080[KA^{-2}]$ fits the experimental data ($R^2 \sim 0.97$-$0.99$) relatively well when the initial temperature (T(0)) of DC-link capacitor 62 is known.

Figure 6:
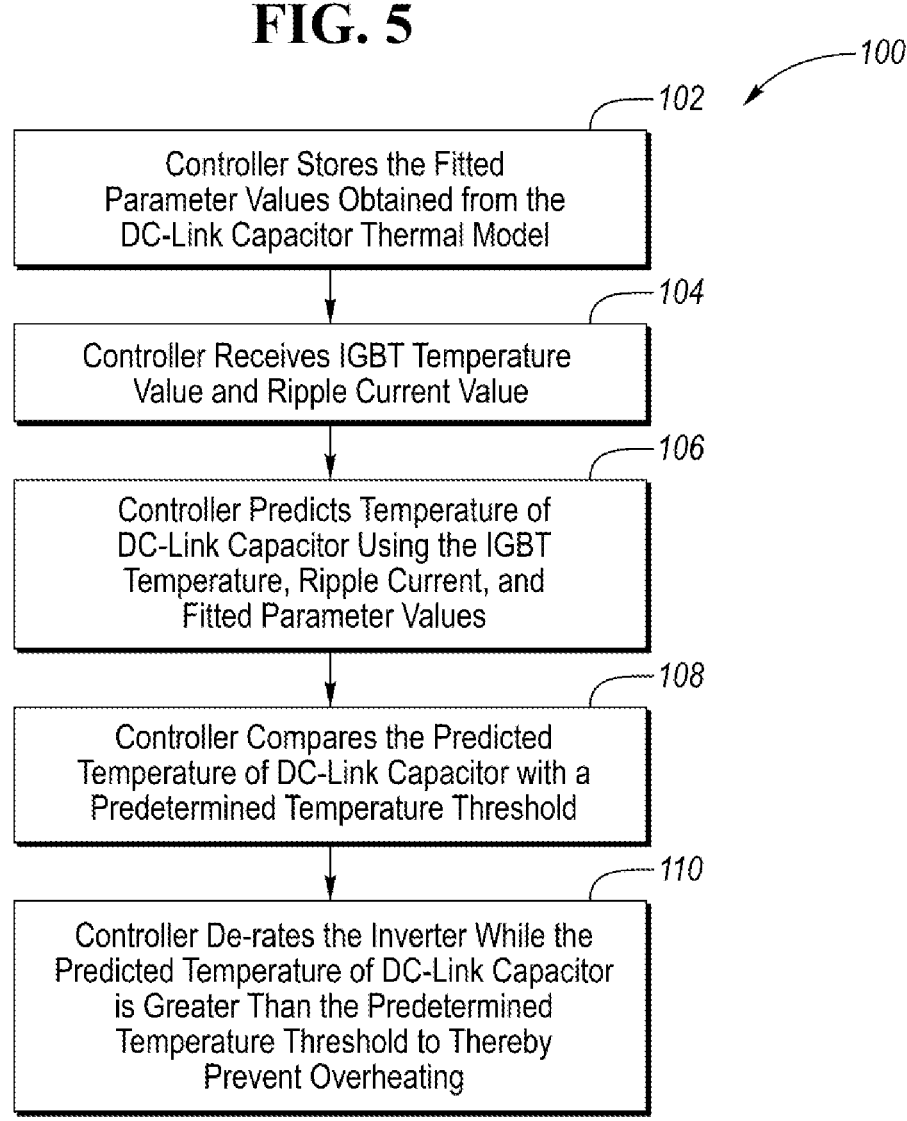
FIG. 6 is a flowchart depicting operation of a method and system for controlling the electric drive system according to a predicted temperature of the DC-link capacitor of the power electronics module to prevent overheating of the DC-link capacitor and components of the inverter of the power electronics module.

Referring now to FIG. 6, with continual reference to the preceding Figures, a flowchart 100 depicting operation of a method and a system for controlling the electric drive system of EV 12 according to a predicted temperature of DC-link capacitor 62 of power electronics module 26 to prevent overheating of the DC-link capacitor and components of inverter 60 is shown. The operation includes controller 63 storing the values of fitted parameters α and $RR_T$ determined from the DC-link capacitor thermal model, as indicated in block 102. As discussed above, these fitted parameters α and $RR_T$ are parameters of a thermal equation for determining a temperature of DC-link capacitor 62. Other parameters of the DC-link capacitor thermal equation include the IBGT temperature and the DC-link capacitor ripple current, which are known sensed (i.e., measured and/or calculated) quantities.

While the electric drive system of EV 12 is in use, the operation further includes controller 63 receiving a signal indicative of a temperature of a power switch 66 (i.e., the IGBT temperature ($T_{IGBT}$)) of a switching unit 64 of inverter 60 and a signal indicative of the ripple current ($I_{Ripple}$) of DC-link capacitor 62, as indicated in block 104. Controller 63 receives the signal indicative of the IGBT temperature ($T_{IGBT}$) from a temperature sensor directly measuring the temperature of the switch. Controller 63 may receive the signal indicative of the DC-link capacitor ripple current from current sensor 71 directly measuring the ripple current of DC-link capacitor 62.

The operation further includes controller 63 predicting a temperature (T(t)) of DC-link capacitor 62 while the electric drive system operates over time by using (i) the IGBT temperature ($T_{IGBT}$), (ii) the DC-link capacitor ripple current ($I^2_{Ripple}$), and (iii) the values of fitted parameters α and $RR_T$ determined from the DC-link capacitor thermal model, as indicated in block 106. Particularly, controller 63 solves the differential equation (equation (3) above) using the IGBT temperature ($T_{IGBT}$) value, the DC-link capacitor ripple current ($I^2_{Ripple}$) value, and the values of the fitted parameters to predict the temperature of DC-link capacitor 62. In this regard, controller 63 implements a discrete version of a solution of the differential equation according to the following equations:

$$g_j = T_{IGBT}(t_j) + I_{Ripple}^2(t_j)RR_T \quad (5)$$

$$\Delta t = t_j - t_{j-1}$$

$$\lambda = \alpha \Delta t$$

$$C_{TD} = \begin{cases} 1 & \text{if } \lambda \leq 0 \\ 1 - \lambda & \text{if } 0 < \lambda < 0.1 \\ 0.81/(\lambda + 0.8) & \text{if } 0.1 \leq \lambda \end{cases}$$

$$T_{cap}(t_j) = T_{cap}(t_{j-1})C_{TD} + g_j(1 - C_{TD})$$

$t_j$ is the present time that the temperature (Tcap) of DC-link capacitor 62 is calculated and $t_{j-1}$ is the previous time that the temperature (Tcap) of the DC-link capacitor 62 was calculated. If no previous temperature history exists (e.g., first key-on event), then use $t_j$=now( ); and $$T_{cap}(t_j) = \min(T_{cap\_max}, T_{IGBT}(t_j) + T_{offset})$$

In an embodiment, the discrete solution (equations (5)) makes use of trapezoidal integration to solve the general differential thermal equation (equation (3)). This embodiment is not meant to be limiting as other discrete solutions are possible.

The operation further includes controller 63 comparing the predicted temperature of DC-link capacitor with a predetermined temperature threshold, as indicated in block 108. Controller 63 de-rates inverter 60 while the predicted temperature of DC-link capacitor 62 is greater than the predetermined temperature threshold to thereby prevent overheating of the DC-link capacitor and components of inverter 60, as indicated in block 110. For example, controller 63 "de-rates" inverter 60 by reducing the input power received by the inverter from battery 24, modifying the switching schedule of the power switches of the inverter, or pausing operation of the inverter for a period of time, etc.

Of course, system controller 48 may be operable to perform any of these steps upon receiving from controller 63 a signal indicative of the predicted temperature of DC-link capacitor 62. As such, system controller 48 may de-rate inverter 60, DC-link capacitor 62, and/or other components of the electric drive system while the predicted temperature of DC-link capacitor 62 is greater than the predetermined temperature threshold.

As described, the temperature of DC-link capacitor 62 can be modeled based on information already known to EV 12, namely the power switch temperature and the DC-link capacitor ripple current. The DC-link capacitor thermal model may potentially replace time-based limits on RMS current that have been used to protect DC-link capacitor and inverter components, thereby maintaining protection of the DC-link capacitor and the inverter without unnecessarily compromising eDrive capability.

As described, DC-link capacitors in inverter systems have been protected by either measuring the DC-link capacitor temperature directly or via an allowed amount of electrical current squared per unit of time. The expense of measuring the DC-link capacitor temperature directly is prohibitive and limiting the amount of current allowed per unit time is overly conservative in many use cases.

As described, embodiments of the present invention therefore provide for predicting the DC-link capacitor temperature to thereby maximize hardware usage while still protecting the hardware from abuse. In this regard, a reference temperature (i.e., the sensed temperature of power switch 66 of inverter 60) and a heating mechanism (i.e., the sensed ripple current of DC-link capacitor 62) are used to predict a temperature of DC-link capacitor 62. The predicted temperature of DC-link capacitor 62 is related to the reference temperature and the heating mechanism by the DC-link capacitor thermal equation. The DC-link capacitor thermal equation has parameter values which represent the contribution of the reference temperature and heating mechanism to the predicted temperature of DC-link capacitor 62. The parameter values are obtained from the DC-link capacitor thermal model via directly measuring the DC-link capacitor while testing a test version of the inverter system. The testing of the test version of the inverter system includes collecting temperature data with a thermocouple on the DC-link capacitor and collecting data which may contribute to heating including the reference temperature. The collected temperature data is then fitted with an analysis tool such as Matlab until the values of the parameters are determined that result in an acceptable fit error. The temperature estimation is then combined with a control strategy to effectively hold the heating mechanism constant or lower to thereby stop the predicted temperature from increasing. The control strategy is continuous during runtime to balance hardware protection with performance. The temperature estimation accuracy may be verified and validated when keyed on or with key on events by a user at various time intervals.

In accordance with other embodiments of the present invention, the temperature of DC-link capacitor 62 is predicted by using the same type of reference temperature (i.e., the sensed temperature of power switch 66 of inverter 60) and another type of heating mechanism. In certain embodiments, the other type of heating mechanism is a sensed input DC current ($I_{DC}$) drawn by inverter 60, as measured by current sensor 73. In this case, the DC-link capacitor thermal equation is:

$$\dot{T}_C = \frac{T_{IGBT} - T}{R_T} + I_{DC}^2 R$$

In the manner described above, this DC-link capacitor thermal equation is rearranged into an equation having unknown constants which are fitted to the experimental data obtained by testing eDrive unit test version 80. The DC-link capacitor thermal model/equation for the heating mechanism being the sensed input DC current drawn by inverter 60 has the same format as with the original type of heating mechanism (i.e., the sensed ripple current of DC-link capacitor 62) but the parameter values will be different in correspondence with the differences in the two currents.

Further, in accordance with other embodiments of the present invention, the temperature of DC-link capacitor 62 is predicted by using the same type of reference temperature (i.e., the sensed temperature of power switch 66 of inverter 60) and both types of heating mechanism (i.e., the sensed ripple current of DC-link capacitor 62 and the sensed input DC current drawn by inverter 60). In these embodiments, the format of the DC-link capacitor thermal model/equation is correspondingly changed. Particularly, the DC-link capacitor thermal equation in this case is:

$$\dot{T}_C = \frac{T_{IGBT} - T}{R_T} + I_{ripple}^2 R_1 + I_{DC}^2 R_2$$

The sensed ripple current ($I_{Ripple}$) of DC-link capacitor 62 and the sensed input DC current ($I_{DC}$) drawn by inverter 60 are known quantities. In the manner described above, this DC-link capacitor thermal equation is rearranged into an equation having unknown constants which are fitted to the experimental data obtained by testing eDrive unit test version 80.

Further, in accordance with other embodiments of the present invention, the temperature of DC-link capacitor 62 is predicted by using the same type of reference temperature (i.e., the sensed temperature of power switch 66 of inverter 60) and two other types of heating mechanisms (i.e., the sensed input DC current drawn by inverter 60 and a sensed output AC current of inverter 60). In these embodiments, the format of the DC-link capacitor thermal model/equation is correspondingly changed. Particularly, the DC-link capacitor thermal equation in this case is:

$$\dot{T}_C = \frac{T_{IGBT} - T}{R_T} + I_{AC}^2 R_1 + I_{DC}^2 R_2$$

The sensed input DC current ($I_{DC}$) drawn by inverter 60 and the sensed output AC DC current ($I_{AC}$) of inverter 60 are known quantities. In the manner described above, this DC-link capacitor thermal equation is rearranged into an equation having unknown constants which are fitted to the experimental data obtained by testing eDrive unit test version 80.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electric drive system, comprising:
   a power electronics module having a DC-link capacitor and an inverter; and
   a controller configured to reduce power output of the inverter while a temperature of the DC-link capacitor, predicted from a thermal equation given a sensed temperature of a power switch of the inverter, a sensed current of the power electronics module, and values of parameters of the thermal equation obtained from a thermal model of the DC-link capacitor, is greater than a threshold to thereby maintain DC-link capacitor temperature lower than the threshold.

2. The electric drive system of claim 1 wherein:
   the thermal model of the DC-link capacitor is derived from a test version of the power electronics module being tested under a plurality of drive cycles in which for each drive cycle a set of information is recorded including a sensed temperature of the power switch of the inverter of the test version of the power electronics module, a sensed current of the test version of the power electronics module, and a sensed temperature of the DC-link capacitor of the test version of the power electronics module.

3. The electric drive system of claim 2 wherein:
the sensed current of the test version of the power electronics module is a sensed ripple current of the DC-link capacitor of the test version of the power electronics module.

4. The electric drive system of claim 1 wherein:
the sensed current of the power electronics module is a sensed ripple current of the DC-link capacitor.

5. The electric drive system of claim 1 wherein:
the sensed current of the power electronics module includes either a sensed DC current drawn by the inverter, the sensed DC current drawn by the inverter and a sensed ripple current of the DC-link capacitor, or the sensed DC current drawn by the inverter and a sensed AC current outputted by the inverter.

6. The electric drive system of claim 1 wherein:
the controller is further configured to reduce power output of the inverter by de-rating operation of the DC-link capacitor.

7. The electric drive system of claim 1 wherein:
the electric drive system is of an electric vehicle and further includes a traction battery and a motor, the DC-link capacitor is disposed between the traction battery and the inverter, and the inverter is configured to convert an input electrical power from the traction battery via the DC-link capacitor into an output electrical power and provide the output electrical power to the motor for propelling the electric vehicle.

8. The electric drive system of claim 1 wherein:
the power switch of the inverter is an insulated gate bipolar transistor (IGBT).

9. An electric vehicle comprising:
an electric drive system including a traction battery, a power electronics module having a DC-link capacitor and an inverter, and a motor, the inverter configured to convert an input electrical power from the traction battery via the DC-link capacitor into an output electrical power and provide the output electrical power to the motor for propelling the electric vehicle;
a controller configured to predict a temperature of the DC-link capacitor using a sensed temperature of a power switch of the inverter, a sensed current of the power electronics module, and parameter values obtained from a thermal model of the DC-link capacitor, wherein the thermal model of the DC-link capacitor is derived from a test version of the power electronics module being tested under a plurality of drive cycles in which for each drive cycle a set of information is recorded including a sensed temperature of the power switch of the inverter of the test version of the power electronics module, a sensed current of the test version of the power electronics module, and a sensed temperature of the DC-link capacitor of the test version of the power electronics module; and
the controller is further configured to de-rate the electric drive system while the predicted temperature of the DC-link capacitor is greater than a temperature threshold to prevent overheating.

10. The electric vehicle of claim 9 wherein:
the sensed current of the test version of the power electronics module is a sensed ripple current of the DC-link capacitor of the test version of the power electronics module; and
the parameter values are obtained from the thermal model of the DC-link capacitor by finding which values of a DC-link capacitor temperature thermal equation having variables of power switch temperature, DC-link capacitor ripple current, and the parameters fit the set of information recorded for at least one of the drive cycles.

11. The electric vehicle of claim 9 wherein:
the sensed current of the power electronics module is a sensed ripple current of the DC-link capacitor.

12. The electric vehicle of claim 9 wherein:
the sensed current of the power electronics module includes either a sensed DC current drawn by the inverter, the sensed DC current drawn by the inverter and a sensed ripple current of the DC-link capacitor, or the sensed DC current drawn by the inverter and a sensed AC current outputted by the inverter.

13. A method for an electric drive system including a power electronics module having an inverter and a DC-link capacitor, the method comprising:
sensing a temperature of a power switch of the inverter;
sensing a current of the power electronics module;
obtaining parameter values of the DC-link capacitor from a thermal model of the DC-link capacitor, wherein the thermal model of the DC-link capacitor is derived from a test version of the power electronics module being tested under a plurality of drive cycles in which for each drive cycle a set of information is recorded including a sensed temperature of the power switch of the inverter of the test version of the power electronics module, a sensed current of the test version of the power electronics module, and a sensed temperature of the DC-link capacitor of the test version of the power electronics module; and
reducing power output of the inverter while the sensed temperature of the power switch, the sensed current of the power electronics module, and the parameter values of the DC-link capacitor are indicative of a predicted temperature of the DC-link capacitor being greater than a threshold to maintain DC-link capacitor temperature lower than the threshold.

14. The method of claim 13 wherein:
the sensed current of the test version of the power electronics module is a sensed ripple current of the DC-link capacitor of the test version of the power electronics module; and
obtaining the parameter values of the DC-link capacitor from the thermal model of the DC-link capacitor includes finding which values of a DC-link capacitor temperature thermal equation having variables of power switch temperature, DC-link capacitor ripple current, and the parameters fit the set of information recorded for at least one of the drive cycles.

15. The method of claim 13 wherein:
the sensed current of the power electronics module is a sensed ripple current of the DC-link capacitor.

16. The method of claim 13 wherein:
the sensed current of the power electronics module includes either a sensed DC current drawn by the inverter, the sensed DC current drawn by the inverter and a sensed ripple current of the DC-link capacitor, or the sensed DC current drawn by the inverter and a sensed AC current outputted by the inverter.

* * * * *